Patented Apr. 5, 1949

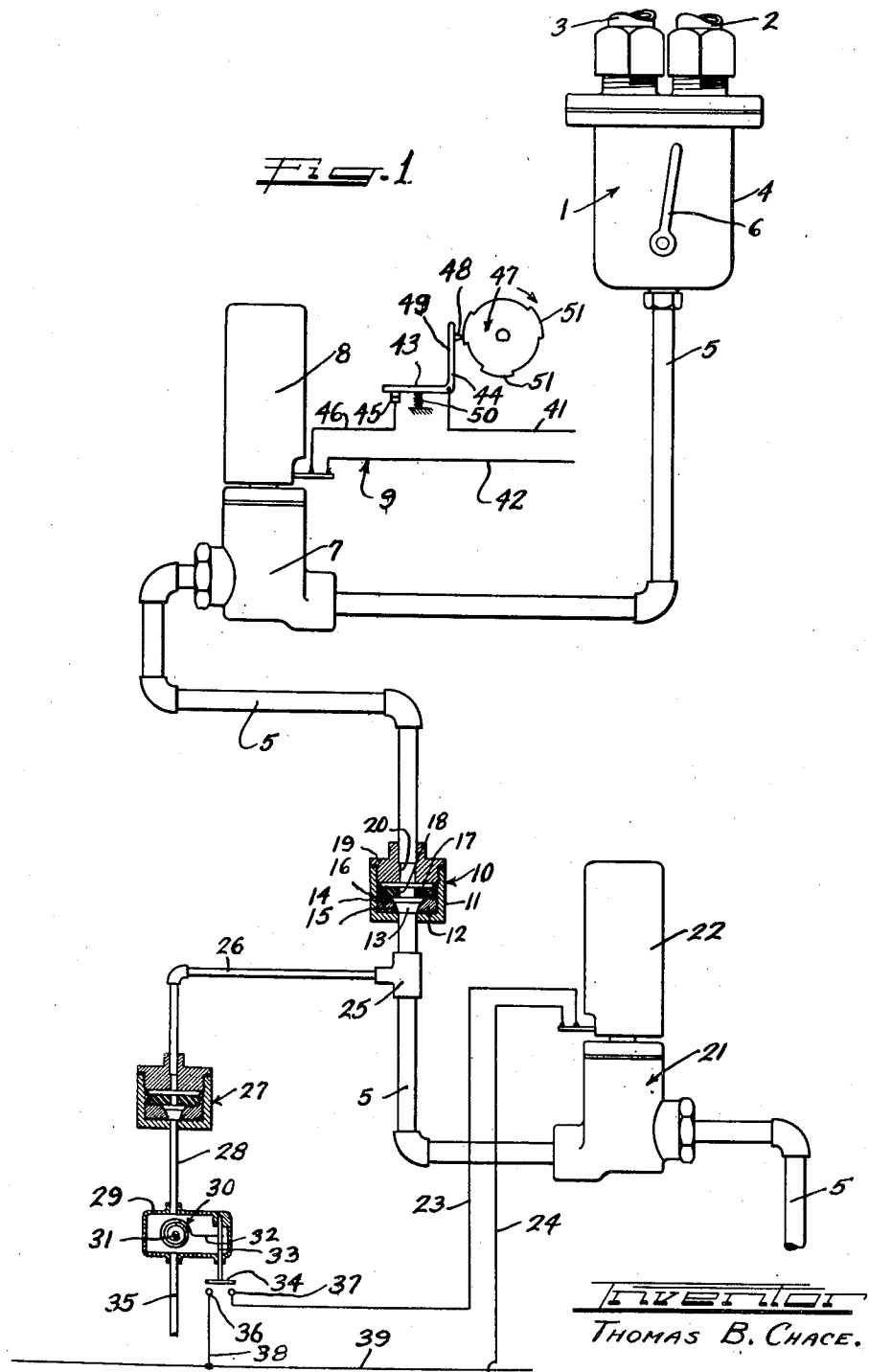

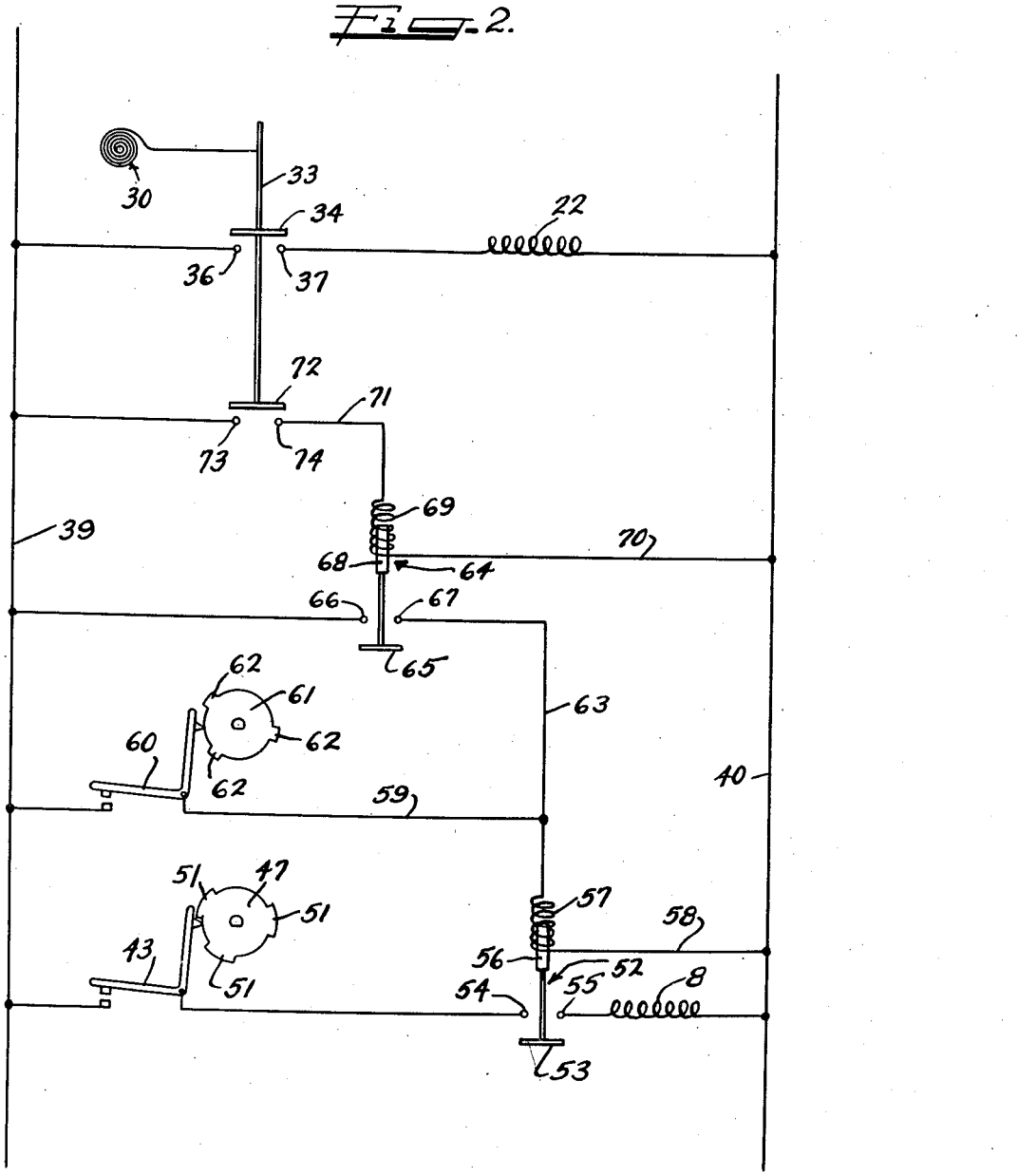

2,466,377

UNITED STATES PATENT OFFICE 2,466,377

FLUID CONTROL DEVICE AND SYSTEM

Thomas B. Chace, Winnetka, Ill., assignor to The Dole Valve Company, Chicago, Ill., a corporation of Illinois Application July 14, 1944, Serial No. 544,955

1 Claim. (Cl. 236—93)

This invention relates to a fluid control device and system and more particularly to fluid means for delivering a predetermined quantity of fluid for a predetermined period of time at a predetermined temperature with safety means provided to prevent delivery if the fluid temperature drops below a predetermined minimum.

In many fluid supply systems where an arrangement is provided for mixing a hot fluid and a cold fluid in such proportions as to deliver a mixed fluid at a predetermined temperature it is desirable to provide some means for interrupting the delivery of mixed fluid should the temperature of one of the fluids to be mixed vary to such an extent as to prevent the normal operation of the mixing or proportioning means.

It is an object of the present invention to provide a novel fluid control device and system having the above highly desirable characteristics.

It is a further object of the present invention to provide a novel fluid control system having means for proportioning and mixing a hot fluid and a cold fluid to deliver a mixed fluid at a predetermined temperature and including means for interrupting the delivery of mixed fluid should the mixing device fail or be unable to deliver fluid at the desired temperature level.

Another object of the present invention is to provide a novel fluid control system including a mixer valve, a shut-off valve and a flow control device, together with a safety shut-off valve means for interrupting the delivery of fluid should the temperature of the delivered fluid drop below a predetermined minimum.

Another and further object of the present invention is to provide a novel fluid system and control including a thermostatically operated shut-off valve of novel design.

Another and still further object of the present invention is to provide a novel fluid control system including a mixer valve and a shut-off valve, the shut-off valve being operated by a thermal responsive element being disposed in a fluid pilot conduit branching off from the main mixed fluid conduit.

Another and still further object of the present invention is to provide a novel fluid control device and system which is particularly suitable for use in the fluid supply system of a dishwashing machine.

The novel features which I believe to be characteristic of my invention are set forth with particularity in the appended claims. My invention itself, however, both as to its organization, method of operation, and manner of construction, together with further objects and advantages thereof, may best be understood by reference to the accompanying drawings, in which:

Figure 1 is a diagrammatic illustration of a fluid control system embodying the novel teachings of the present invention; and Figure 2 is a wiring diagram of a modified form of the present invention.

The fluid control system diagrammatically illustrated in Figure 1 of the drawings includes an automatic temperature controlled mixer valve 1 having a hot fluid inlet duct 2 and a cold fluid inlet duct 3. The automatic temperature controlled mixer valve 1 may be of any conventional design having a temperature responsive means therein for automatically proportioning fluid of normally different temperatures to maintain the resulting mixed fluid at a predetermined temperature level. The fluid, such, for example, as water, is mixed within the housing 4 of the device 1 and is delivered through a mixed fluid supply pipe 5. The automatic temperature controlled mixer valve 1 may, if desired, be provided with a temperature adjusting member 6 for changing the temperature setting of the temperature responsive means to maintain the mixed fluid at any of a number of different predetermined temperature levels.

For purposes of simplicity of illustration, the entire mixed fluid delivery pipe system has been designated by the reference numeral 5. Interposed in this mixed fluid delivery pipe 5 is a shut-off valve 7 which may be of any conventional design, such, for example, as a shut-off valve which is electrically operated by a solenoid 8 through an energization circuit 9.

Interposed in the delivery pipe on the downstream side of the shut-off valve 7 is an automatic constant rate of flow maintaining device 10. This flow device 10 is preferably of a design similar to that described and claimed in the co-pending application of Leslie A. Kempton, entitled "Flow control," Serial No. 545,312, filed July 17, 1944, Patent No. 2,454,929, and assigned to the same assignee as the present invention. This constant rate of flow maintaining device is arranged to deliver a substantially constant volume of liquid therethrough in a given interval of time irrespective of wide variations or fluctuations in pressure on the inlet and outlet sides thereof. For the purpose of understanding the present invention, it is sufficient to say that this constant rate of flow maintaining device 10 includes a housing 11 in which a seat 12 is disposed having a central opening 13 therethrough defined by two frusto-conical surfaces 14 and 15.

The frusto-conical surface 14 merges into a shoulder 16 upon which a disk 17 of resilient material having a central orifice 18 is disposed. The central orifice 18 is substantially smaller than the opening defined by the upper edge of the frusto-conical surface 14 and for that reason it will be understood that as the pressure drop across the resilient disk 17 increases the disk 17 is flexed to vary the effective size of the orifice 18. It has been found that with a construction of this kind a constant delivery rate will be maintained over a wide variation in pressure, such, for example, as over a variation in pressure from 20 pounds per square inch to 150 pounds per square inch. A cap 19 is provided for the housing 11 which retains the seat member 12 in place. The cap 19 is provided with a duct 20 which connects with the delivery pipe 5.

On the downstream side of the flow control device 10 is a solenoid operated shut-off valve 21 having a solenoid 22 which is energized through conductors 23 and 24 in a manner presently to be described. The delivery pipe 5 on the downstream side of the shut-off valve 21 may be connected to the container to be supplied with the fluid, such, for example, as the tub or container of a dishwashing machine.

A T-joint 25 is interposed in the delivery pipe 5 between the flow-control device 10 and the shut-off valve 21. A small bleeder line 26 is connected to this T-joint and is arranged to receive a small portion of the fluid delivered through the main delivery pipe 5.

A flow control device 27 is connected to the bleeder line 26 and is of the same general construction as the flow control device 10. It is arranged to deliver, however, a much smaller volume of fluid per given interval of time than the device 10. By way of example and not by way of limitation, the flow control device 10 may be arranged to deliver fluid at the rate of five gallons per minute, while the flow control device 27 may be arranged to pass fluid at a rate of one-half gallon per minute. The flow control device 27, on its outlet side, is connected through a pipe or conduit 28 to a housing 29 having a thermal responsive element 30 therein. The thermal responsive element 30 may be of any suitable design and construction and for purposes of illustration has been shown as a spiral bimetal element fixed at its inner end to a shaft 31 which may be angularly moved about its own axis for purposes of varying the temperature setting of this particular element. The bimetal element 30 includes a free end portion 32 which is connected to to a pin 33 having a bridging contact 34 at the outer end thereof. This pin 33 is arranged for free longitudinal movement through the casing wall, but suitable packing material (not shown) will of course be provided to prevent a leakage of the fluid through the wall of the housing 29 at the point where the pin 33 passes therethrough. A drain pipe 35 is connected to the housing 29.

From the above description it will be apparent that a small quantity of fluid will constantly flow through the housing 29 containing the temperature responsive element 30 whenever the solenoid operated valve 7 is open.

The bridging contact 34 carried on the end of the pin 33 is arranged to bridge two contacts 36 and 37 whenever the thermostatic element 30 is heated above a predetermined minimum by the fluid flowing through the housing 31. The conductor 23 of the solenoid 22 is connected to contact 37. The contact 36 is connected through a conductor 38 to a supply conductor 39. A second supply conductor 40 is connected through the conductor 29 of the solenoid 22. The two supply conductors 39 and 40 may be connected to any suitable source of electric energy.

The energization circuit 9 of the solenoid 8 is diagrammatically illustrated as including a conductor 41 and a conductor 42 which are connected to any suitable source of electric energy. The conductor 41 is connected to a movable contact arm 43 which is mounted for angular movement about a point 44. The movable contact arm 43 is arranged to be moved into engagement with a stationary contact 45 connected through a conductor 46 to the solenoid 8 by a timer driven cam 47 engaging a cam follower 48 on the tail portion 49 of the arm 43. It will be understood that the movable contact arm 43 is normally biased to its open position in any suitable manner such as by means of a spring 50 and is moved to its closed position when the cam follower 48 rides up on to one of the high portions 51 on the cam disk 47.

Since the flow control device 10 delivers fluid at a constant rate, it will be apparent that the cam disk 47 not only determines the time when fluid will be delivered but will also determine the total amount of fluid which will be delivered to the container or tub of the dishwashing machine under normal operation with the temperature of the fluid from the mixer valve at substantially its predetermined temperature setting.

The operation of the fluid control system illustrated in Figure 1 of the drawings will now be described. The automatic temperature controlled mixer valve 1 is connected through the inlet conduit 2 to a source of hot water, such, for example, as a source normally having water at around 200° temperature. The cold water inlet duct 3 is connected to a source of cold water or water at a relatively lower temperature than the hot water supply, such, for example, as the conventional cold water supply pipe or tap usually available from the city supply. The temperature adjusting lever 6 is set to deliver water through the mixed fluid supply pipe at a temperature somewhere between the temperature of the hot water supply and the cold water supply, and for purposes of illustration, may be said to deliver water at 170° temperature.

The timer driven cam 47 is arranged to deliver a predetermined quantity of water at 170° to the dishwashing machine at different spaced intervals of time. As the cam 47 rotates one of the high points 51 moves the cam follower 48 to close the switch 43 and energize the solenoid 8. This opens the shut-off valve 7 and water flows through the delivery pipe 5 and the flow control device 10 to the tub of the dishwashing machine. Even though the pressure of the hot or cold water supplies should vary, the flow control device 10 permits a constant volume of water to pass therethrough in a given interval of time, and as has been indicated above, is arranged to deliver in the illustrated embodiment at the rate of five gallons per minute. If, for example, the tub is to be supplied with fifteen gallons of water, the cam 47 is cut in such a manner that the solenoid 8 remains energized for a period of three minutes.

When the shut-off valve 7 is first opened, water is preliminarily directed through the pipe 26 and the thermostat housing 29. If the water is above a predetermined minimum temperature, the bridging contact 34 is closed, which immediately opens the shut-off valve 21. If the water is below the predetermined desired minimum at the time when the shut-off valve 7 is opened, the thermostatically controlled shut-off valve 21 will not open due to the fact that the thermostat 30 will not close the bridging contact 34. As soon as the water comes up to the desired temperature, however, the shut-off valve 21 opens and fluid is delivered through the delivery pipe 5 to the dishwasher.

In Figure 2 of the drawings I have illustrated a modified form of the invention wherein provision is made for automatically closing the shut-off valve 7 if the water flowing through the thermostatic chamber 29 remains below a predetermined minimum temperature for more than a predetermined desired period of time. In other words, this will stop continual draining of water through the drain pipe 35 if the water does not come up to temperature right away.

The elements of Figure 2 which are similar to the elements of Figure 1 have been given the same reference characters. More particularly, a contactor 52 is interposed in the control circuit of the solenoid 8 of the shut-off valve 7. This contactor 52 has a bridging contact 53 which is arranged to close against stationary contacts 54 and 55. The bridging contact 53 is carried on an armature 56 actuated by a solenoid 57. The solenoid 57 is connected at one end to the supply conductor 40 through a conductor 58. At the other end it is connected through a conductor 59 and a cam actuated switch 60 to the power supply conductor 39. The cam actuated switch 60 is arranged to be engaged by a cam 61 having raised portions 62 on its peripheral surface. The raised portions 62 are so positioned that they will cause the switch 60 to close at the same time that the raised portions 51 on the cam 47 cause the switch 43 to close. The raised portions 62 are much shorter in length than the raised portions 51 for a reason which will presently be understood.

The upper end of the solenoid 57 is also connected through a conductor 63 and a contactor 64 to the power supply conductor 39. The contactor 64 includes a bridging contact 65 which is arranged to close against the stationary contacts 66 and 67. The bridging element 65 is moved to its closed position by an armature 68 associated with a solenoid 69. The solenoid 69 is connected at its lower end to the power supply conductor 40 through a conductor 70. The solenoid 69 is connected at its upper end through a conductor 71 and a bridging contact 72 to the power supply conductor 39. The bridging contact 72 is arranged to close against the stationary contacts 73 and 74 and is carried by the shaft 33 which is actuated by the thermostat 30. It will thus be observed that the bridging contact 72 is carried on the same shaft as is the bridging contact 34 which is arranged to energize the solenoid 22 of the shut-off valve 21.

The operation of the control circuit shown in Figure 2 is as follows: As the timer motor rotates the cams 47 and 61 the switches 43 and 60 are simultaneously closed. Closure of the switch 60 energizes the solenoid 57 which causes the bridging contact 53 to close against the stationary contacts 54 and 55. Since the cam actuated switch 43 was closed at the same time as the switch 60, it will be apparent that the solenoid 8 of the shut-off valve 7 is energized. This opens the shut-off valve 7 and water starts to flow through the flow-control device 27 (Figure 1) and through the thermostat chamber 29. If the water is above a predetermined minimum temperature the thermostatic element 30 causes the bridging contacts 34 and 72 to close against their respective stationary contacts. This energizes the solenoid 22 of the shut-off valve 21 and opens the same. It also energizes the solenoid 69 to close the bridging contact 65 of the contactor 64. This, in effect, is a holding circuit for the contactor 52. After a brief period of time, as determined by the peripheral extent of the raised portions 62 of the cam 61, the switch 60 will open.

If, at the time when the switches 43 and 60 are closed by the cams 47 and 61, the water temperature is below a predetermined minimum, neither the bridging contact 34 nor the bridging contact 72 will close. Water will continue to flow through the thermostatic chamber 29 due to the fact that the shut-off valve 7 is open, until the switch 60 opens. If the water is still below the predetermined temperature at the time when the switch 60 opens, the main shut-off valve 7 will be de-energized. If, on the other hand, the low temperature condition was only temporary and the bridging contact 72 closes before the cam actuated switch 60 is opened, the holding circuit of the contactor 52 will be established and water will be supplied to the dishwasher tub.

While I have shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

A fluid control system comprising a fluid supply duct, flow control means connected to said supply duct including a shut-off valve and means for maintaining a predetermined rate of flow therethrough, means including a delivery passageway connected to said flow control means, means for opening said shut-off valve, additional independent means for interrupting the flow of fluid to said delivery passageway if the fluid flowing thereto falls below a predetermined minimum temperature, and means for closing said shut-off valve if the fluid remains below said predetermined temperature for a predetermined period of time.

THOMAS B. CHACE.

REFERENCES CITED

The following references are of record in the file of this patent:

UNITED STATES PATENTS

| Number | Name | Date |
| --- | --- | --- |
| 1,511,204 | Aseltine | Oct. 7, 1924 |
| 1,521,475 | Purdy | Dec. 30, 1924 |
| 1,666,331 | Fischer et al. | Apr. 17, 1928 |
| 1,775,293 | Pfening | Sept. 9, 1930 |
| 2,271,644 | Jaynes | Feb. 3, 1942 |
| 2,285,305 | Reid | June 2, 1942 |
| 2,321,573 | Chace | June 15, 1943 |